United States Patent [19]

Meyer et al.

[11] Patent Number: 5,740,687
[45] Date of Patent: Apr. 21, 1998

[54] FORMING APPARATUS FOR STRIP MATERIALS

[75] Inventors: Bruce E. Meyer, Lakewood; David H. Cunningham, Fort Lupton; Ronald W. Shell, Firestone, all of Colo.

[73] Assignee: New Tech Machinery Corporation, Denver, Colo.

[21] Appl. No.: 426,041

[22] Filed: Apr. 21, 1995

[51] Int. Cl.$^6$ .................. B21D 5/08; B21D 28/00
[52] U.S. Cl. .................. 72/131; 72/181; 83/629; 83/636; 83/697; 226/186
[58] Field of Search .......... 72/181, 131; 83/636, 83/629, 697, 694; 226/186

[56] References Cited

U.S. PATENT DOCUMENTS

| | | | |
|---|---|---|---|
| 1,347,912 | 7/1920 | Richardson . | |
| 2,352,675 | 7/1944 | Yoder . | |
| 2,505,241 | 4/1950 | Gray et al. . | |
| 2,826,235 | 3/1958 | Gudmestad . | |
| 3,442,429 | 5/1969 | McLellan | 226/186 |
| 3,529,461 | 9/1970 | Knudson . | |
| 3,775,821 | 12/1973 | Somerville . | |
| 3,791,185 | 2/1974 | Knudson | 72/181 |
| 3,847,071 | 11/1974 | Goodley | 226/183 |
| 3,886,779 | 6/1975 | McClain | 72/181 |
| 3,921,424 | 11/1975 | Pearson | 72/158 |
| 4,269,055 | 5/1981 | Sivachenko et al. | 72/181 |
| 4,471,641 | 9/1984 | Mitchell | 72/181 |
| 4,660,399 | 4/1987 | Suter et al. | 72/181 |
| 4,716,754 | 1/1988 | Youngs | 72/181 |
| 4,787,233 | 11/1988 | Beymer | 72/181 |
| 4,796,797 | 1/1989 | Nakako | 72/177 |
| 4,899,566 | 2/1990 | Knudson | 72/181 |
| 5,148,694 | 9/1992 | Pearson | 72/181 |

*Primary Examiner*—Daniel C. Crane
*Attorney, Agent, or Firm*—Timothy J. Martin; Michael R. Henson

[57] ABSTRACT

A forming apparatus for forming a selected profile in a sheet of material includes a frame, a sheet drive to advance the sheet of material through the frame, a drive assembly for powering the sheet drive, forming rollers to configure the sheet into the desired profile and a shear assembly to cut the formed sheet into desired lengths. The sheet drive includes pairs of coacting rollers with each pair comprising a driven roller connected to the drive assembly and a free-wheeling roller that is adjustably mounted relative to its associated driven roller. The shear assembly has a housing that movably mounts a pair of opposed blade mounts that have facing channels which receive lateral edges of a blade. These channels are wider than the blade thickness so that the blade freely floats and is thus self-aligning between dies. The blade has a cutting edge configured to always attack the formed sheet at a rake angle of at least five degrees so that all cutting of the formed sheet is by a scissor action as opposed to a chop cut.

21 Claims, 9 Drawing Sheets

5,740,687

FORMING APPARATUS FOR STRIP MATERIALS

FIELD OF INVENTION

The present invention generally relates to material fabricating machines, but more particularly relates to forming machines wherein an elongated strip of material is advanced through the machine against forming elements which operate to progressively shape the strip of material into a desired profile. Specifically, the present invention concerns a metal forming apparatus that receives the elongated strip of material, either in a discrete length or from a continuous coil, to fabricate a shaped member for the construction industry.

BACKGROUND OF THE INVENTION

Material forming machines play a significant role in industry today. Their various applications include, for instance, roll forming, cutting and extrusion techniques. Of particular significance to the present invention is a metal forming machine which receives an elongated sheet of metal material at an entrance and advances the sheet in a downstream direction, through a variety of forming rollers which configure the sheet into a desired profile along one or more of its longitudinal margins, after which the formed sheet is discharged at an exit location. Typically, these machines work with a continuous coil of metal material being fed into the machine, although material strips of discrete lengths have also been used. With continuous feed applications, a shearing assembly is often provided to cut the formed strip into discrete lengths after it has exited the machine. These types of forming machines have been widely used to fabricate metal strips into useful shaped members, such as gutters, roof panels and siding panels, to name a few.

Existing metal fabricating machines typically have a framework which supports a drive assembly for advancing the elongated strip of material from the entrance to the exit. The drive assembly is coupled to one or more pairs of coacting rollers centrally located along the pathway of the strip. It has been thought necessary that these coacting pairs include two driven rollers each journaled for synchronous rotation about first and second axis, respectfully, which are themselves located above and below the strip as it passes through the framework. A plurality of forming rollers are also disposed along the pathway of the strip to configure at least one of its longitudinal margins into a desired profile by progressively bending the margin(s) into a particular shape. Sometimes these forming rollers are each independently mounted to the framework at selected locations, but another technique involves mounting a group of forming elements together in forming station sets along the pathway of the strip. While a variety of different types of forming rollers have been used, Applicant has found that utilizing forming stations which provide adjustment along three axes reduces the bulk of the forming machine and allows a single machine to create geometrically similar profiles of different dimensions. Such a technique is described in my U.S. Pat. No. 5,394,722 entitled APPARATUS FOR FORMING PROFILES ON STRIP MATERIALS, issued Mar. 7, 1995.

Once the elongated metal strip is formed into a desired profile, it is cut at the exit location of the forming machine. Typically, a guillotine style cutter is used and includes a blade having a cutting edge, usually in the shape of a single tooth. In some devices, this blade is housed between two cold rolled steel plates and is rigidly connected to a handle. At least one die, composed of several steel plates arranged in a stock, is connected to the interior of the housing and positioned to be in flush contact with the blade as the blade is advanced downward through the formed sheet. These blades "chop" the sheet into a desired length.

While all of these existing machines are quite useful and effective in fabricating metal strips into shaped members, such as panels and gutters, their drive systems require numerous chain couplings in order to provide the synchronous rotary power to each of the driven rollers. This tends to make these machines bulky and increases the need for repair and adjustment if the driven rollers of each coacting pair do not perform in unison. Another drawback of existing forming machines is that their cutters which operate in a chopping motion, have a tendency to damage the profile of the metal as it is cut into desired lengths. In addition, the blades of these devices are not self-aligning within the housing because they are rigidly connected to the handle member. This increases the occurrence of off-center cuts of the formed sheet and can cause damage to both the interior of the housing and the contoured blade surface if the blade is not properly advanced through the housing. Alignment of such blades is extremely time consuming.

Accordingly, there remains a need for improved metal forming machines which can receive an elongated strip of material to configure it into a useful cross-sectional profile so that shaped members may be produced. There is further a need for these machines to require fewer components and better shear assemblies, without jeopardizing the quality of the finished product.

SUMMARY OF INVENTION

It is an object of the present invention to provide a new and useful apparatus for forming elongated strips of material into desired cross-sectional profiles as the strip of material is advanced through the apparatus.

Another object of the present invention is to provide a forming apparatus of reduced components, yet capable of efficiently fabricating elongated strips of material, such as metal.

A further object of the present invention is to provide a forming apparatus having a drive assembly with fewer driven rollers and reduced mechanical couplings therebetween.

Still a further object of the present invention is to provide an improved shear assembly as a retrofit to existing forming machines.

Yet another object of the present invention is to provide a sheer assembly for metal forming apparatus which is more durable and more effective at cutting formed sheets of metal material.

Yet a further object of the present invention is to provide a gutter forming machine with a shear assembly which utilizes an improved cutting technique.

According to the present invention, then, a forming apparatus is provided which is adapted to receive an elongated sheet of formable material and operative to form a selected profile thereon. The apparatus broadly includes a frame that supports a sheet drive and drive assembly therefor with the frame having an entrance at a first end and an exit at a second end so that the sheet drive engages a portion of the elongated sheet and advances the sheet in a downstream direction through the frame to discharge the sheet at the exit. The drive assembly is interconnected to a sheet drive which is also supported by the frame and includes a plurality of pairs of coacting rollers, each pair being longitudinally spaced from an adjacent pair in a downstream direction from the entrance to the exit. In order to form the elongated sheet into a selected profile, a plurality of forming rollers are disposed in the frame downstream of the entrance. These forming rollers are positioned to engage portions of the elongated sheet and to form the sheet into the select profile. A shear assembly is also provided to selectively actuably cut the formed sheet into sections of selected length.

In the exemplary embodiment of the present invention, each of the plurality of pairs of coacting rollers of the sheet drive includes a free-wheeling roller rotatably journaled with respect to the frame on a transverse axle and positioned above the elongated sheet, and a driven roller rotatably journaled with respect to the frame on a transverse axle and positioned below the elongated sheet. These axles define transverse rotation axes which are oriented parallel to the sheet. The drive assembly is interconnected to each of the driven rollers and operates to rotatably drive the driven rollers which, themselves, impart an equal counter-rotation to their corresponding free-wheeling rollers. Preferably, each of the driven rollers and free-wheeling rollers has a circumferential layer of polyurethane. Also, it is preferred that each of the free-wheeling rollers is adjustable relative to its associated driven roller; for example each free-wheeling roller may be supported on a subframe that is adjustable relative to the frame by adjustable subframe mounts.

The selectively actuable shear assembly broadly includes a pair of opposed movable blade mounts, a floating blade, a housing for receiving the blade mounts and the floating blade, and a shear drive which operates to advance the blade mounts whereby the blade may be reciprocally advanced along a pathway to cut the formed sheet into sections of selected length. Each of the blade mounts are arranged in an opposed relationship and so that the channels face one another. The channels are sized and adapted to capture a respective side edge of the floating blade therein. Thus, it is desirable that each of the facing channels of the blade mounts has a width which is greater than the width of its respective side edge of the blade, thereby allowing the blade to freely align itself within the pathway as the shear drive advances the blade toward the formed sheet. A roll pin is disposed at upper and lower ends of the facing channels of the blade mounts and the blade includes a notch formed at each upper corner thereof for engaging a respective roll pin. This allows the lateral side edges of the blade to be releasably securable to the blade mounts.

The shear assemblies housing includes a rear plate and a face plate which are spaced apart to define a central cavity which is sized and adapted to receive the blade mounts and the floating blade therein. Opposed regions of the both the face plate and the rear plate are each formed to have an opening which corresponds to the profile along a lower surface of the formed sheet, thus permitting the formed sheet to advance through the housing. The rigid members secured to the housing define a pathway for the blade as the formed sheet is cut and include at least one die secured to either the rear plate or the face plate which is shaped to correspond to the profile along the lower surface of the formed sheet. A similarly constructed second die may also be provided which is securable to another of the rear plate and the face plate. The shear drive includes a pair of rotary gears, each of which is adapted to matably engage rack gear teeth on one of the blade mounts. An opening is formed in the housing adjacent each of the blade mounts with a respective rotary gear extending through the opening to engage the rack gear teeth.

The shear assembly's blade has a contoured cutting edge which is operative, as the blade is advanced through the formed sheet, to progressively cut lateral edges of the formed sheet at oblique rake angles prior to cutting a medial portion of the formed sheet. It is preferred that these oblique rake angles be greater than five degrees. Once the blade makes an initial cut of the medial portion, it continues to progressively shear the medial portion at oblique rake angles in at least one transverse direction away from this initial cut. The contoured cutting may be configured to include at least one tooth for making a medial cut, but it may be configured to have a plurality of teeth when it is desirous to have a formed sheet with an ogee-type profile.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

The present invention is directed to a forming apparatus adapted to receive an elongated flat sheet of a formable material and to configure the sheet into a desired profile. The formable material may be fed into the machine from a continuous coil or as discrete elongated panels. In particular, the present invention is useful to fabricate metal sheets, in order to form a profile along one or both of its longitudinal edge margins, for use as roof panels, siding, gutters and the like. While the structure of the present invention is described below with respect to a machine particularly adapted for forming gutters of the ogee-type, it should be understood that the present invention is not limited merely to forming machines for producing gutters but, rather, other machines which operate to fabricate shaped members out of flat sheets of formable material.

Figure 1:
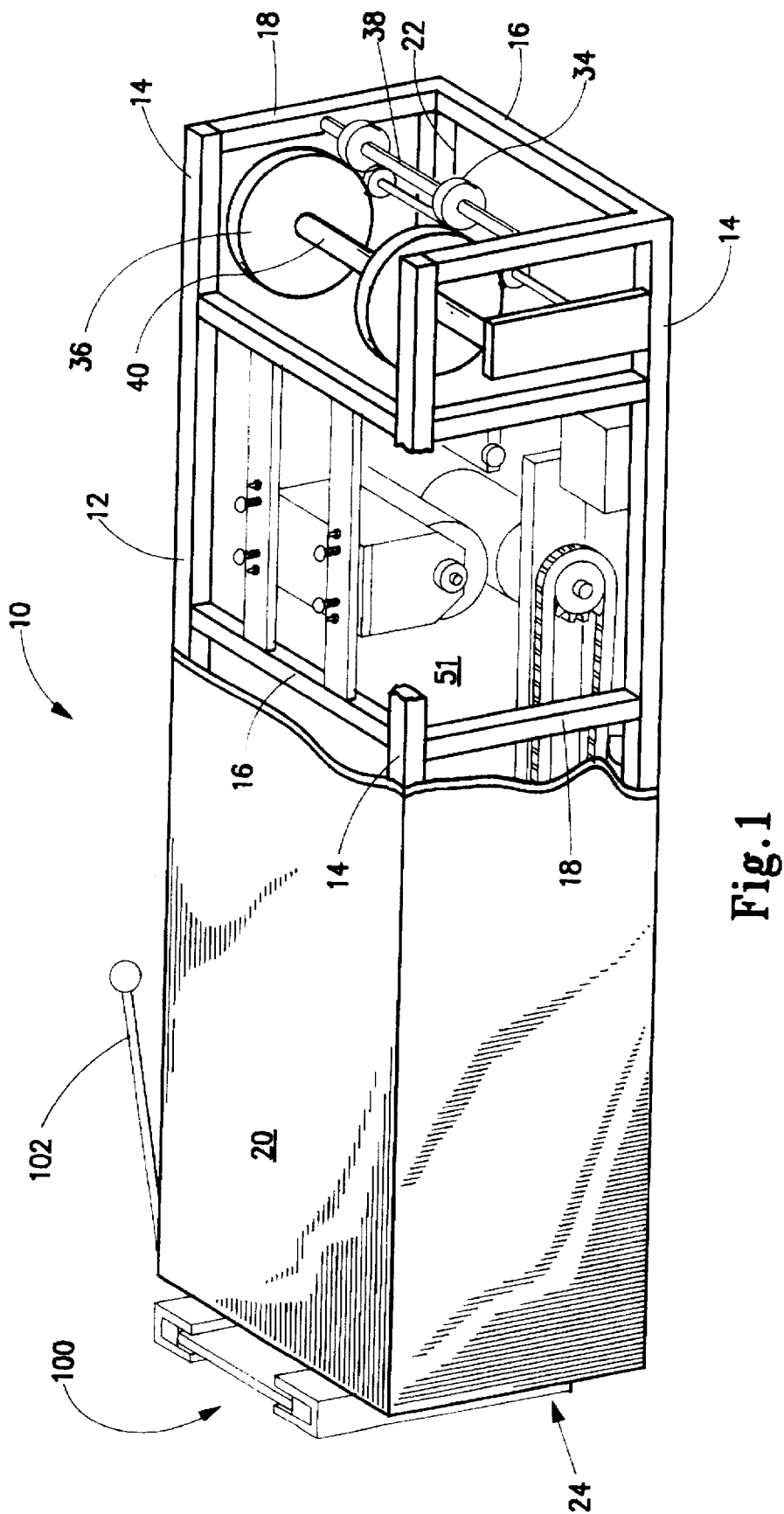
FIG. 1 is a perspective view, partially cut away, of the forming apparatus according to the exemplary embodiment of the present invention.
Figure 2:
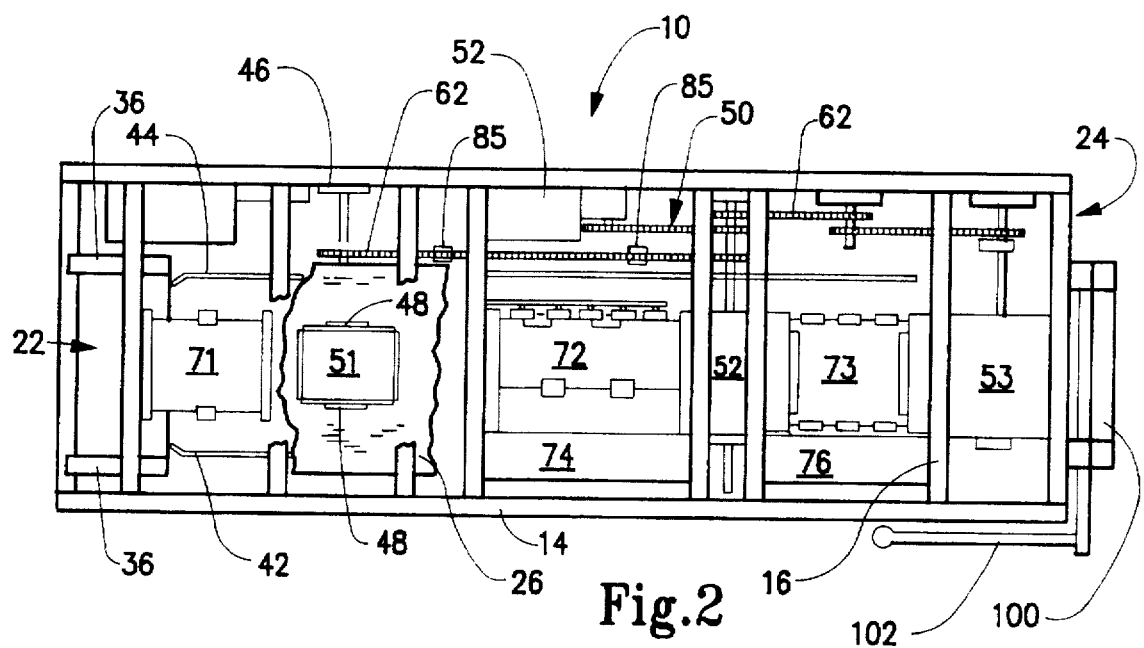
FIG. 2 is a top plan view of the forming apparatus of FIG. 1 with the outer panel coverings removed therefrom.

By way of explanation, then, a representative forming apparatus according to the present invention is shown in FIGS. 1 and 2. Here, forming apparatus 10 is constructed as a machine adapted to fabricate gutters of the ogee-type. Forming apparatus 10 includes a framework 12 formed as a plurality of longitudinally extending beams 14 interconnected by transverse beams 16 and upright beams 18. Frame 12 is encased by an outer panel covering 20 which extends therearound. Forming apparatus 10 has an entryway 22 located at a first end and an exit 24 located at a second end which is in a longitudinally positioned downstream location from the first end of frame 12.

Forming apparatus 10 is particularly adapted to receive an elongate flat sheet of formable material, such as metal, and to shape the sheet of material into a shaped member which may be used, for instance, in the construction industry. The elongated sheet enters the forming apparatus 10 at an upstream location defined by entrance 22 and initially comes into contact with a plurality of spaced apart pairs of guide rollers 34, 36 which are respectively journaled for rotation about guide roller axles 38 and 40. Guide rollers 36 and 38 operate to initially align elongated sheet 26 (FIG. 4) at a central location within frame 12. With reference to FIG. 2, it may be seen in this embodiment that guide bars 42 and 44 are provided to guide sheet 26 through forming apparatus 10 as sheet 26 is advanced in a downstream direction from entrance 22 to exit 24.

The various component assemblies which comprise forming apparatus 10 are best shown with reference to FIG. 2, wherein it may be seen that forming apparatus 10 includes a drive assembly 50 that will be described in greater detail below with reference to FIG. 6. Drive assembly 50 includes a plurality of drive stations 51–53 which are each located at longitudinally spaced apart downstream regions from each other within frame 12. Drive stations 51–53 are mechanically coupled to one another and powered by a chain assembly best shown in FIG. 6. The drive assembly 50 and the various drive stations 51–53 will be described in more detail below with reference to FIGS. 3–5.

From FIG. 2, it may be seen that a plurality of skate and keel assemblies 71–73 are located within frame 12 at spaced apart downstream locations. Skate and keel assembly 71 is located upstream of drive station 51, while skate and keel assemblies 72 and 73 are located, respectively, between drive stations 51 and 52 and 52 and 53. These skate and keel assemblies 71–73 act upper and lower as tracking platforms for sheet 26 as it is advanced through forming apparatus 10. A first group of forming stations in the form of forming roller box 74 is disposed in frame 12 adjacent to skate and keel assembly 72. Similarly, a second group of forming rollers in the form of forming roller box 76 is disposed in frame 12 adjacent to skate and keel assembly 73. These forming stations 74, 76 include a plurality of adjustable rollers which operate to configure a longitudinal margin 28 of the strip into a selected profile as it is advanced through forming apparatus 10. Finally, a shear assembly 100 is mounted to frame 12 proximate exit location 24. Shear assembly 100 is selectively actuable by handle 102 and operates to cut the formed sheet 26 as it exits forming apparatus 10 at location 24. The construction and operation of shear assembly 100 will be described in greater detail below with reference to FIGS. 7–11.

Figure 3:
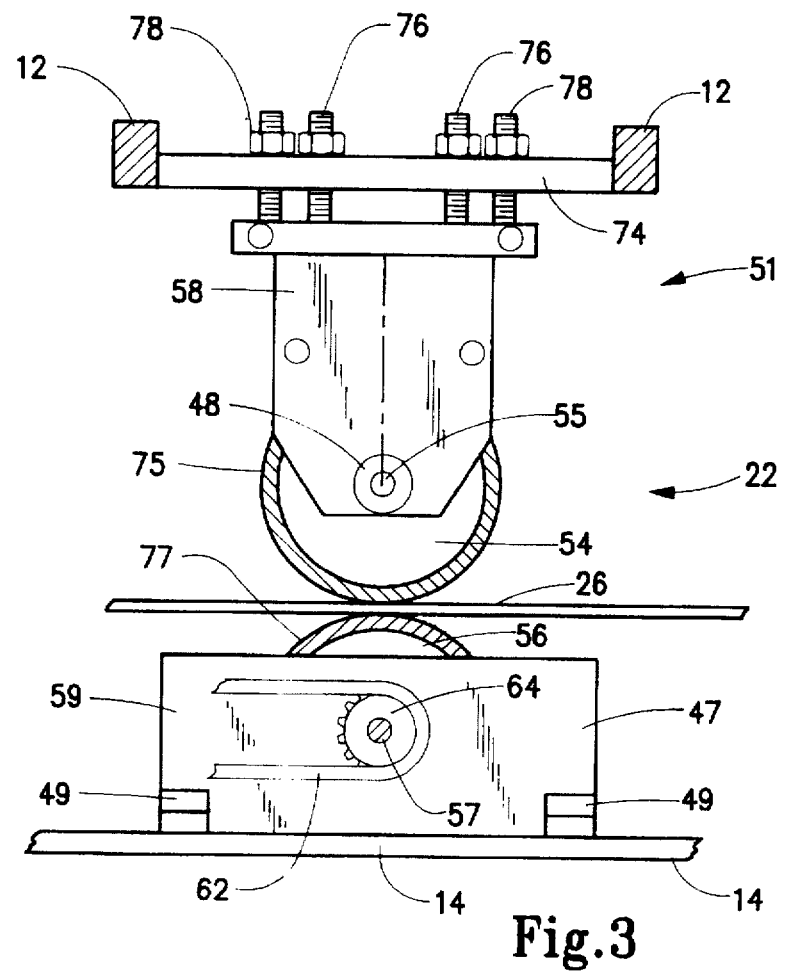
FIG. 3 is a side view in elevation and in partial cross-section showing a representative construction of a coacting pair of rollers (one driven and one free-wheeling) according to the exemplary embodiment of the present invention.
Figure 4:
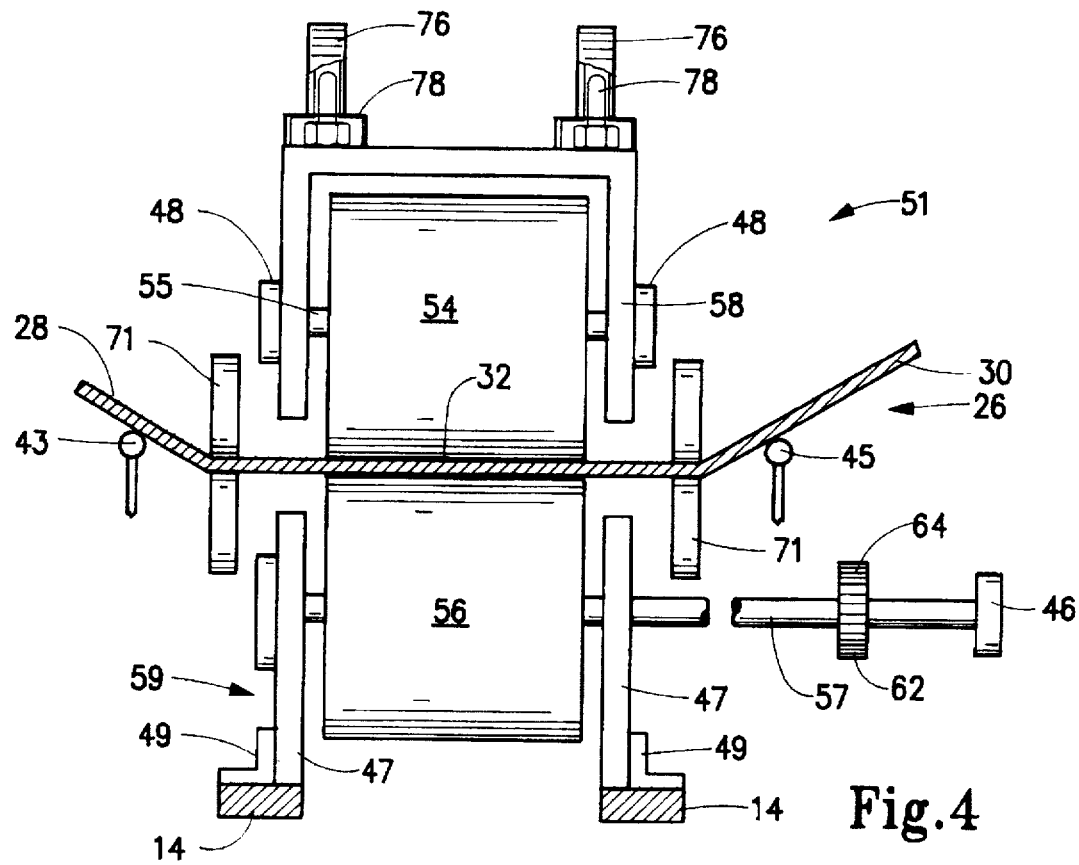
FIG. 4 is an end view in elevation, looking upstream of a first representative pair of coacting rollers of FIG. 3 and showing the elongated strip of metal material passing therebetween.

The preferred construction for a representative drive station 51 is shown with reference to FIGS. 3 and 4. However, it should be appreciated by one skilled in the art that drive station 52 would be constructed similarly. Drive station 51 includes a pair of coacting rollers 54 and 56, each respectively journaled for rotation around first axle 55 and second axle 57. First axle 55 and second axle 57 define axes for rollers 54 and 56 that are oriented transversely to the downstream direction in which sheet 26 is advanced and are parallel to sheet 26 as it passes through forming apparatus 10. Axles 55 and 57 are each mounted to frame 12 by bearing blocks 46 and 48 as shown in FIG. 2. Upper roller 54 is a free-wheeling roller, while lower roller 56 is a driven roller. Preferably, each of these rollers is covered by a circumferential layer of polyurethane, 75 and 77, as shown in FIG. 3. Free-wheeling roller 54 and driven roller 56 co-act with one another to grip a central portion 32 of sheet 26 as it is advanced in the downstream direction.

Both free-wheeling roller 54 and driven roller 56 are disposed within housings 58 and 59, respectively. Housing 59 for driven roller 56 is stationary relative to frame 12, and it includes plates 47 secured to angle bars 49 mounted to longitudinal rails 14. Housing 58 for free-wheeling 54 is adjustably mounted to frame 12 by screws 76 and jackscrews 78 which permit vertical adjustment of the free-wheeling roller 54 relative to driven roller 56. It should be understood, then, that as sheet 26 is advanced from the upstream region proximate entrance 22 through guide rollers 34 and 36 and between skate and keel assembly 71, its lateral margins 28 and 30 are initially deflected upwardly by guide bars 42 and 44 (as represented by guide bar sections 43 and 45), while central portion 32 is sandwiched between free-wheeling roller 54 and driven roller 56.

Figure 5:
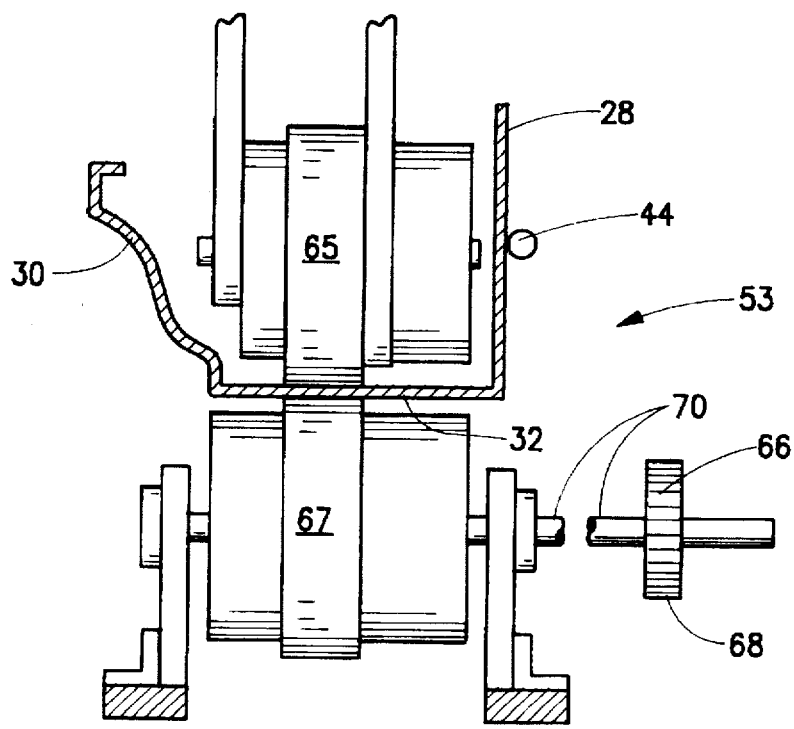
FIG. 5 is an end view in elevation looking upstream of a second representative pair of coacting rollers according to the exemplary embodiment of the present invention and showing the formed sheet passing therebetween.

FIG. 5 shows a construction for the third drive station 53 which is located downstream of drive stations 51 and 52 and proximate exit 24 in forming apparatus 10. As with the construction discussed above with respect to drive station 51, drive station 53 also includes a free-wheeling roller 65 and a driven roller 67 each journaled for rotation about a first axle 69 and a second axle 70, respectively which define transverse rotational axes for rollers 65 and 67. Driven roller 67 is rotated in a counterclockwise direction by the operation of a chain 68 which engages sprocket wheel 66. This counterclockwise rotation of driven roller 67 imparts clockwise rotation of free-wheeling roller 65 to advanced sheet 26 toward exit 24. Here, however, it can be seen that both the free-wheeling roller 65 and the driven roller 67 narrower contact surfaces than free-wheeling roller 54 and driven roller 56 by virtue of the decreased width of central portion 32 after sheet 26 has advanced through forming apparatus 10 and past forming stations 74 and 76. At this point, also, sheet 26 has been fabricated into an ogee-type profile as seen by the configurations of longitudinal margins 28 and 30.

Figure 6:
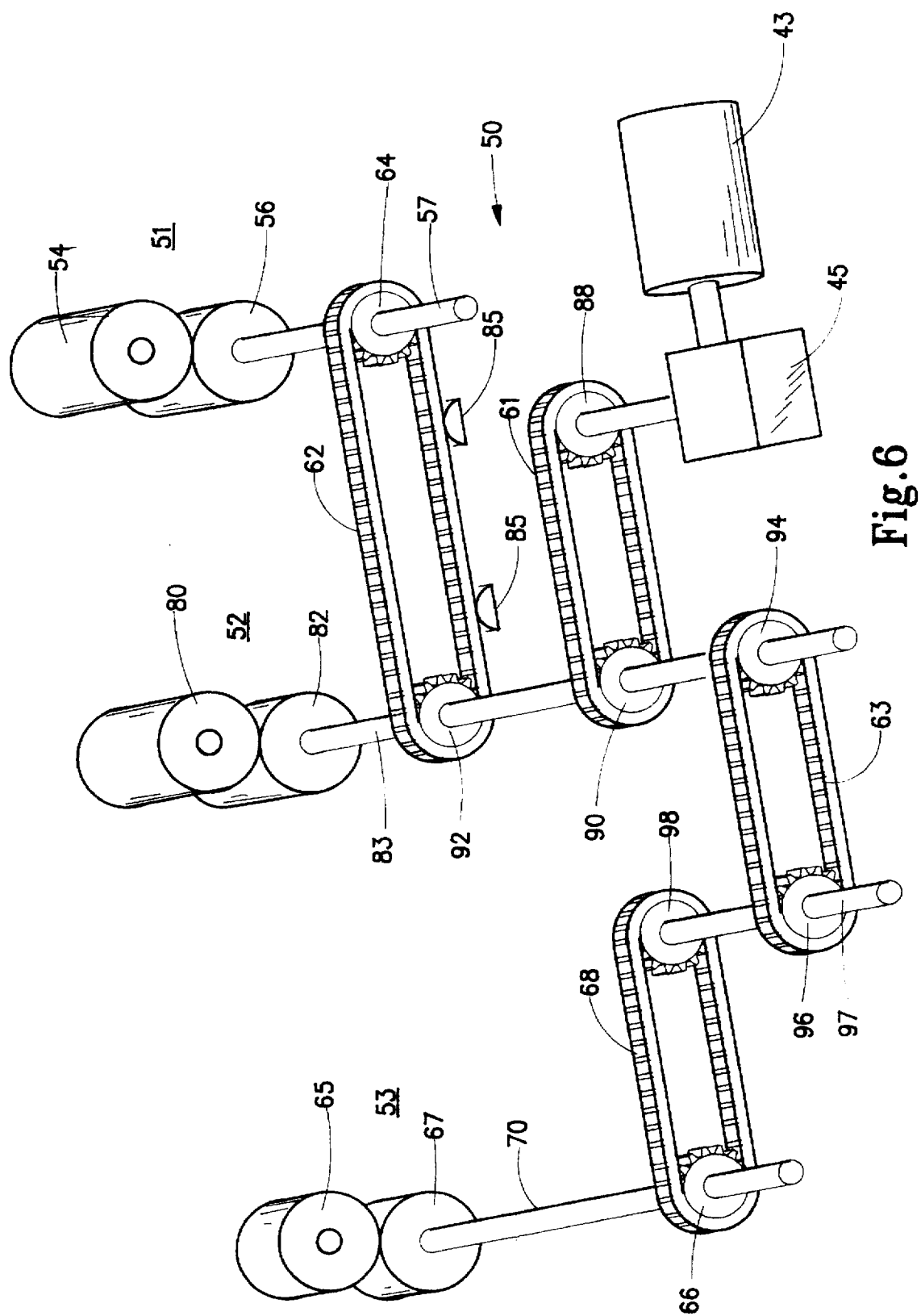
FIG. 6 is a perspective view of the drive system and driven therefor according to the exemplary embodiment of the present invention.

FIG. 6 shows the construction and operation of the drive assembly 50 according to the exemplary embodiment of the present invention. Here it may be seen that drive assembly 50 is empowered by a driver in the form of a motor 43 which is connected to gear box 45 to provide rotary power to each of the drive stations 51–53. Motor 43 drives sprocket wheels 88 and 90, which are coupled together by chain 61, in a counterclockwise direction as shown in FIG. 6. Sprocket gear 90 is disposed about second axle 83 of driven roller 82 and, thereby, causes sprocket wheels 92 and 94 to also rotate in a counterclockwise direction. Sprocket wheel 92 is coupled by a second chain 62 to sprocket wheel 64 which is disposed about second axle 57 of driven roller 56. Located beneath a lower portion of chain 62 between sprocket wheels 92 and 64 are a pair of polyurethane chain tighteners 84 and 85.

It should be understood that the counterclockwise rotation of sprocket wheel 92 causes sprocket wheel 64 to also rotate in a counterclockwise direction, thereby permitting rotation of driven roller 56. Driven roller 56 is thus rotatably driven in a counterclockwise direction; the counterclockwise rotation of driven roller 56 imparts a clockwise rotation of free-wheeling roller 54 about first axis 55 to advance sheet 26 downstream. Likewise, driven roller 67 of drive station 53 rotates in the counterclockwise direction by virtue of its mechanical coupling to sprocket wheel 94. To illustrate, as sprocket 94 rotates counterclockwise, it causes sprocket wheel 96 to rotate by virtue of its mechanical coupling thereto by chain 63. A similar counterclockwise rotation is imparted to sprocket wheel 98 which is adjoined to sprocket wheel 96 by axle 97. As sprocket wheel 98 rotates counterclockwise, the second axle 70 of driven roller 67 in drive station 53 is also caused to rotate in the same manner. Moreover, free-wheeling roller 65 rotates in the clockwise direction. From the foregoing, it should be understood by one of ordinary skill that the chain coupling discussed above enables each of the coacting pairs of rollers in drive stations 51–53 to cooperate in unison with one another.

Figure 7:
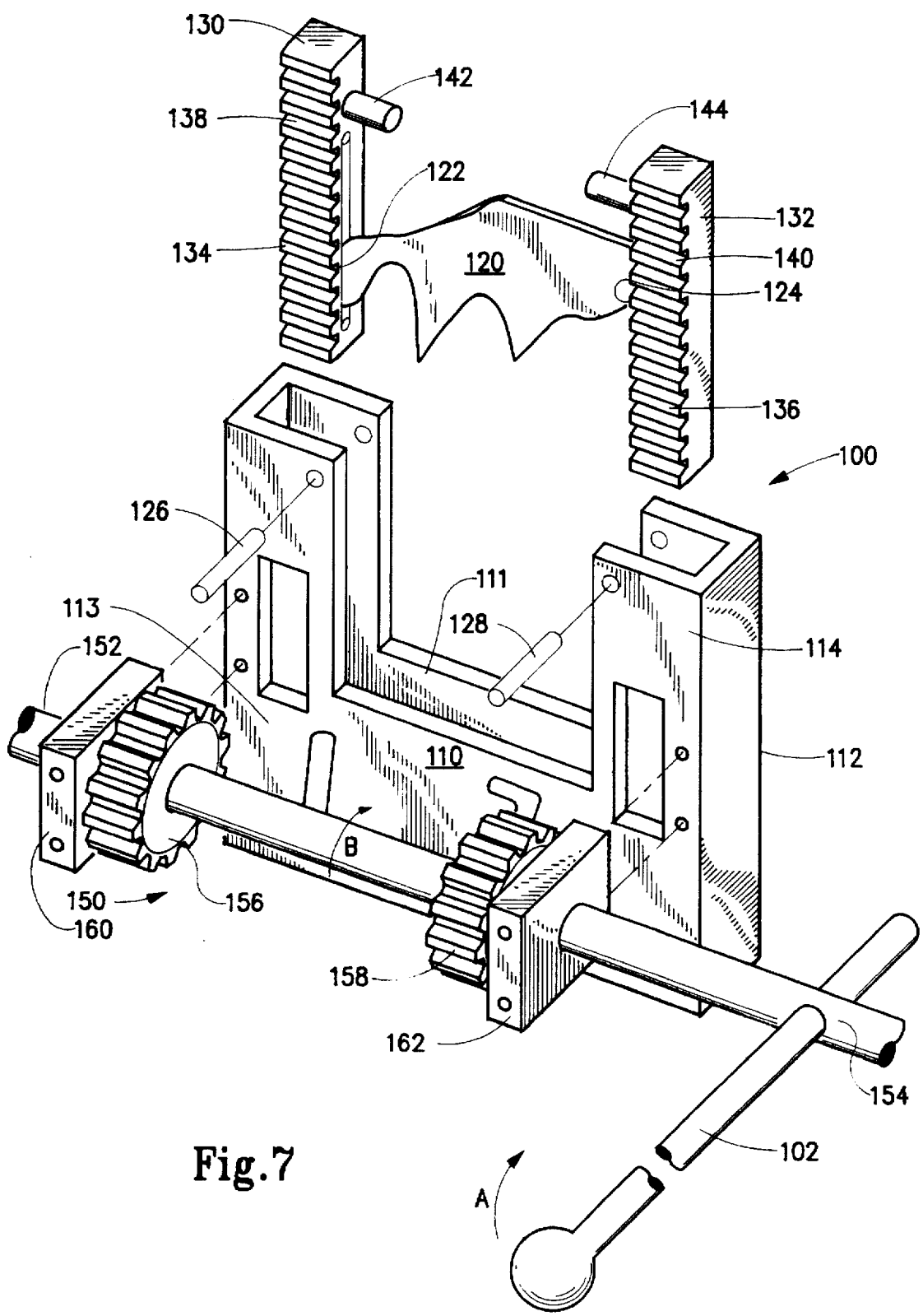
FIG. 7 is an exploded view in perspective and partially broken away of the rear of the shear assembly according to the exemplary embodiment of the present invention.

As noted above, a shear assembly is mounted to frame 12 proximate exit 24 for cutting the formed sheet 26 as it exits forming apparatus 10. FIGS. 7–10 show the preferred embodiment for shear assembly 100. In FIG. 7 it may be seen that shear assembly 100 includes a housing 110 having a front plate 112 and a rear plate 114 which are spaced apart a width to form a cavity 111 therebetween. The shear assembly also includes a blade 120 and a pair of blade mounts 130 and 132 are respectively disposed on a first lateral side edge 122 and a second lateral edge 124 of blade 120. Blade mounts 130 and 132 are also each formed to have a plurality of transverse ridges 134 and 136 on their front faces 138 and 140 to form a rack gear. Each of blade mounts 130 and 132 has inwardly extending stop element such as stop elements 142 and 144. The combination of the blade 120 and blade mounts 130, 132 is adapted to be slidably received in cavity 111, after which a pair of first and second stop pins 126 and 128 may be inserted into housing 110 so that they span across cavity 111 defined by front plate 112 and rear plate 114.

A manual actuation assembly 150 is secured to handle 102 along a distal end 154 of axle 152 although it should be understood that a mechanically powered actuation assembly could be employed, if desired. Actuation assembly 150 includes a pair of spaced apart gears 156 and 158 and is mounted to rear plate 114 of housing 100 by mounting blocks 160 and 162. Mounting blocks 160 and 162 may be connected to rear plate 114 at screw locations 159 and 161, as shown, or by any other conventional means, such as welding. Once actuation assembly 150 is mounted to housing 110, it may be seen that sprocket gear 156 is able to matably engage some of the transverse ridges 134 on blade mount 130 by virtue of an opening 116 located on rear plate 114. Similarly, gear 158 may matably engage some of the transverse ridges 136 on blade mount 132 as a result of opening 118 on rear plate 114 which is located therebetween.

It should be understood that, in operation, the formed sheet 26 is discharged from frame 12 at exit location 24 and passes first through a profiled opening 113 of rear plate 14 and then through a corresponding profiled opening 115 within front plate 112. Profiled openings 113 and 115, of course, each correspond to the formed profile of sheet 26 as it exits forming apparatus 10. Accordingly, in order to cut formed sheet 29 into a discrete length, one actuates handle 102 in the direction of arrow A which would cause axle 152 to rotate in the direction of arrow B, thereby advancing blade 120 in a downward direction through cavity 111 to cut the formed shape. Similarly, an opposite rotation of handle 102 would cause the actuation assembly to raise blade 122 in order to allow another section of formed sheet 26 to pass through housing 110. However, blade 120 would be prevented from raising above a certain level, which level is determined by the stop elements 142 and 144 coming into contact with pins 125 and 128, respectively.

Figure 8:
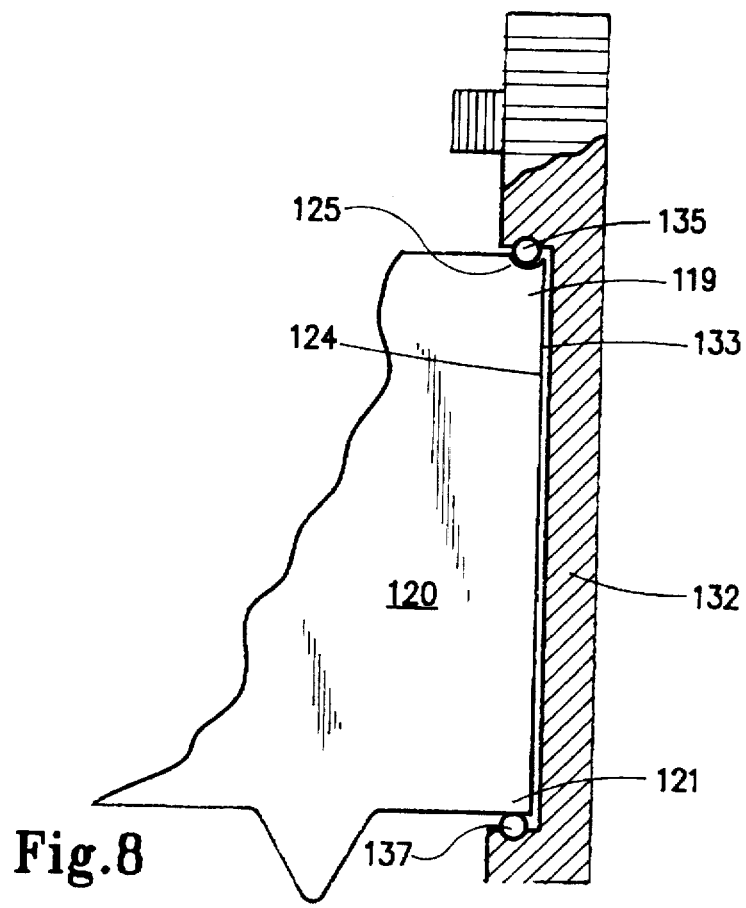
FIG. 8 is an end view in elevation showing one of the blade mounts of the shear assembly of FIG. 7 showing the attachment of a lateral side edge of the blade.

FIG. 8 shows the releasable securement of a second lateral side edge 124 of blade 120 to blade mount 132. While only one side edge of blade 120 is shown, it should be understood by one of ordinary skill that a similar connection would be achieved for first lateral side edge 122 of blade 120 onto blade mount 130. As may be seen in FIG. 7, then, blade mount 132 is provided with an elongated interior channel 133. Channel 133 has a first pin 135 disposed at an upper portion thereof and a second pin 137 disposed at a lower portion thereof. A notch 125 is provided on the upper corner of lateral side edge 124 of blade 120. This notch 125 has a curvature which corresponds to the curvature of pin 135. In order to insert blade 120 into blade mount 132, then, the upper corner, and specifically notch 125, is engaged with pin 135 and then pivoted into channel 133. This pivoting then causes lower corner 121 to be snapped into place on the upper surface of lower pin 137. In this position, blade 120 is prevented from inadvertently dislodging from channel 133. However, channel 133 is also configured to have a width which is greater than the thickness of blade 120 so that blade 120 may float freely therein and become self-aligning as it is advanced downward to cut formed sheet 26.

Figure 9:
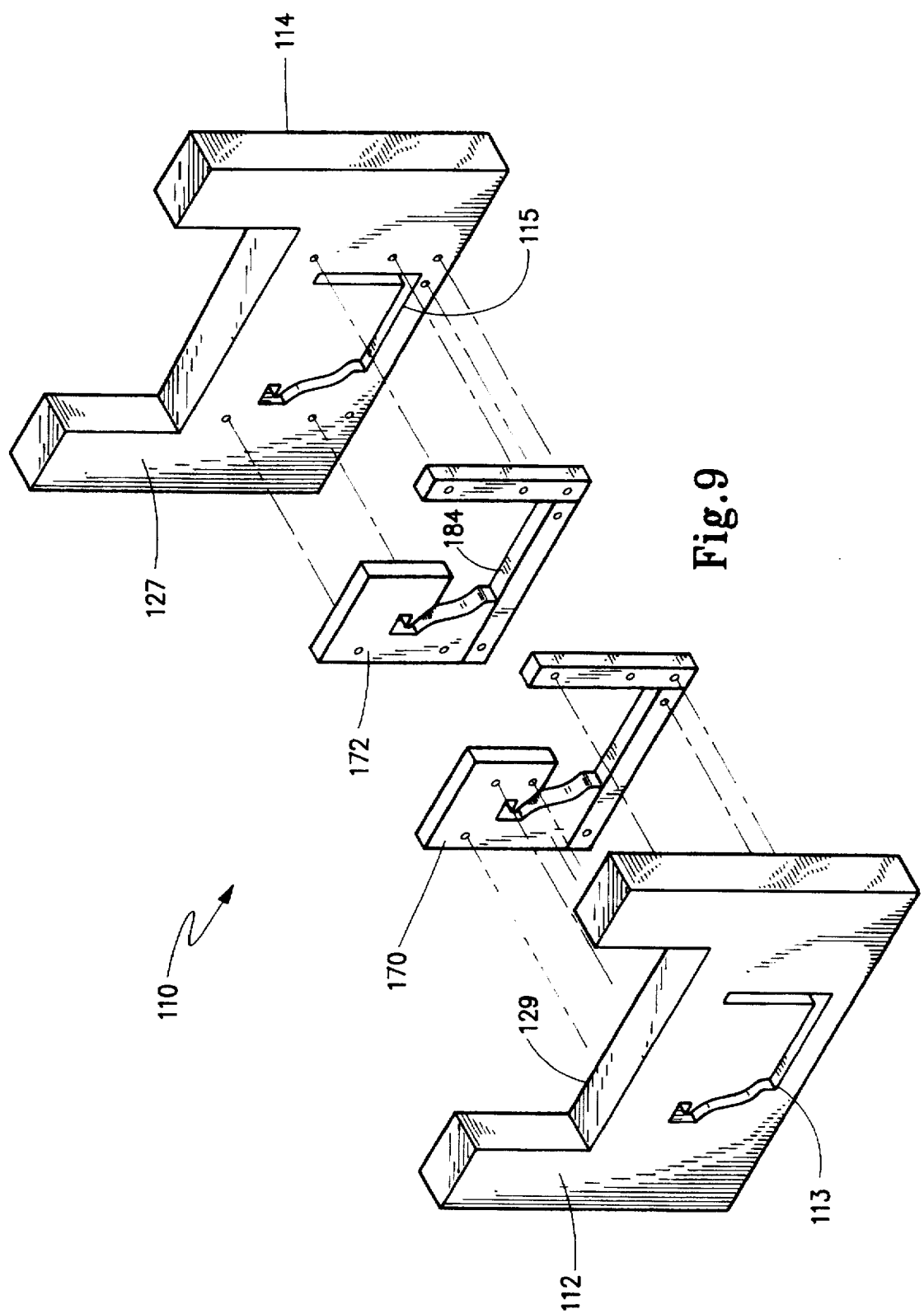
FIG. 9 is a perspective exploded view in elevation of the housing for the shear assembly of FIG. 7 and showing the positioning of the die elements therein.

In FIG. 9, it may be seen that a pair of die members 170 and 172 are disposed within housing 110 between front plate 112 and rear plate 114. Die member 172 is secured to inner surface 127 of rear plate 114 and die member 170 is secured to inner surface 129 of front plate 112. A plurality of opposed mounting holes are disposed within the die members 170 and 172 and the interior surfaces 127 and 129 of housing 110 for this purpose. Of course, other means of attachment could be used.

Figure 10:
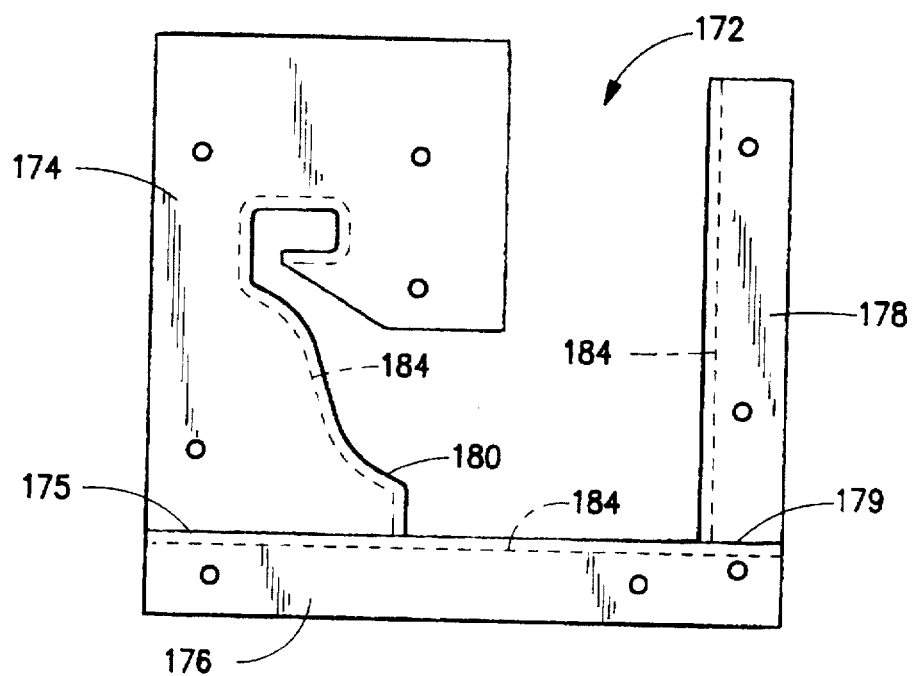
FIG. 10 is an end view in elevation of the configuration of a representative one of the die elements shown in FIG. 9.

The construction of die member 172 according to the exemplary embodiment of the present invention is shown in FIG. 10. While only die member 172 is described, it should be understood that die member 170 is of similar construction. Die member 172 includes a generally rectangular plate 174, a first longitudinal plate 176 and a second longitudinal plate 178. These three plates are arranged so that they define an interior edge which corresponds to the profile along a lower surface of formed sheet 26 as the sheet is discharged from forming apparatus 10. In the configuration shown, first longitudinal plate 176 is an abutment with both a base edge 175 of plate 174 and a proximal edge 179 of second longitudinal plate 178. A margin area 184 along the upstream side of die member 172 is formed to have a curvature directed into the page so as to guide the formed sheet into the shear assembly.

Figure 11A:
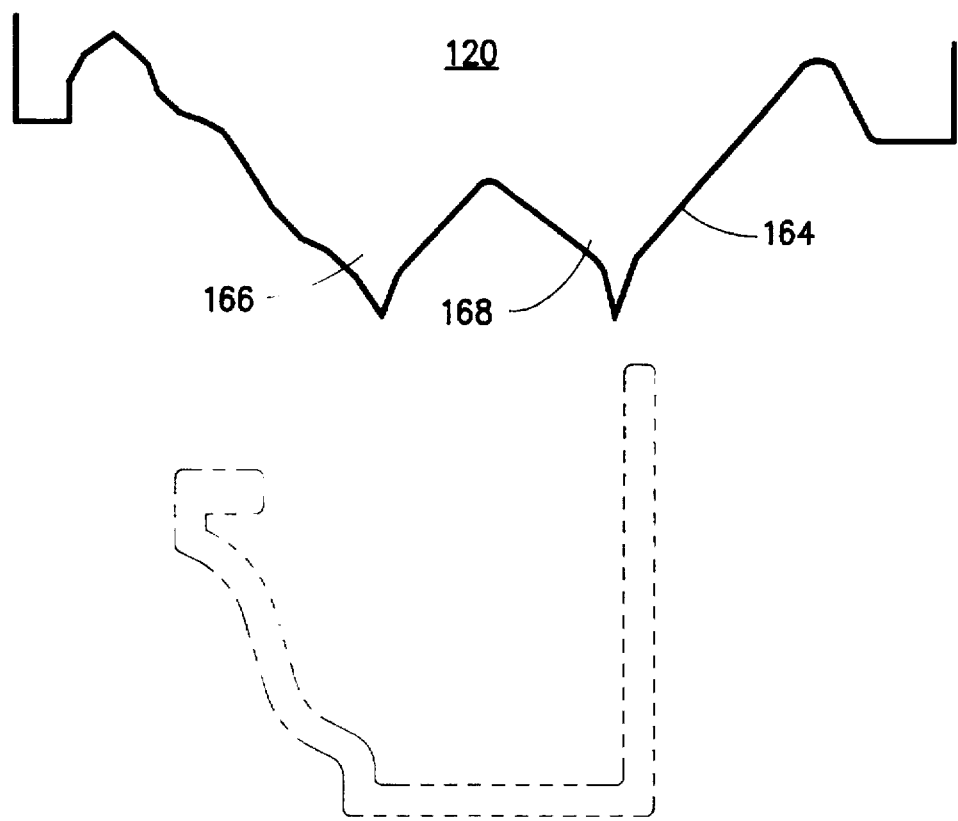
FIGS. 11(a)–11(d) are diagrammatic illustrations showing the progressive scissor-cut action of the blade employed in the shearing assembly as it advances through the formed sheet.
Figure 11B:
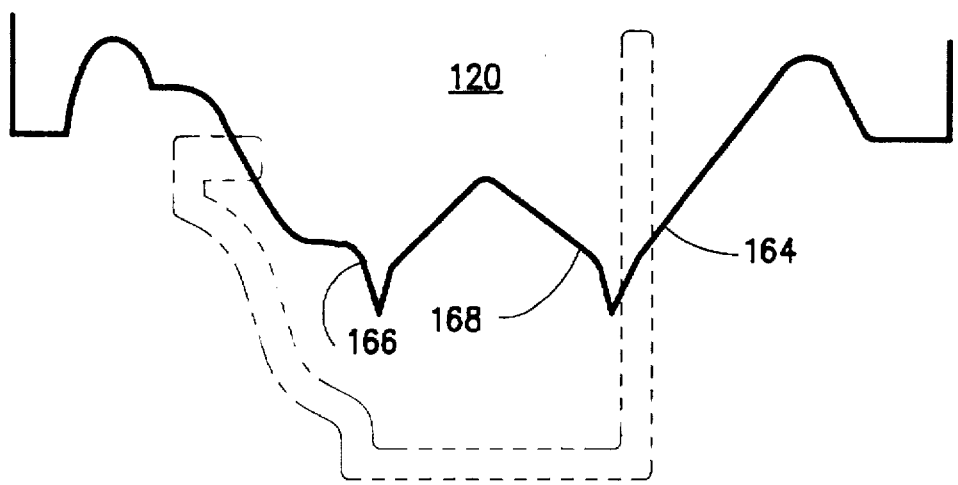
Figure 11C:
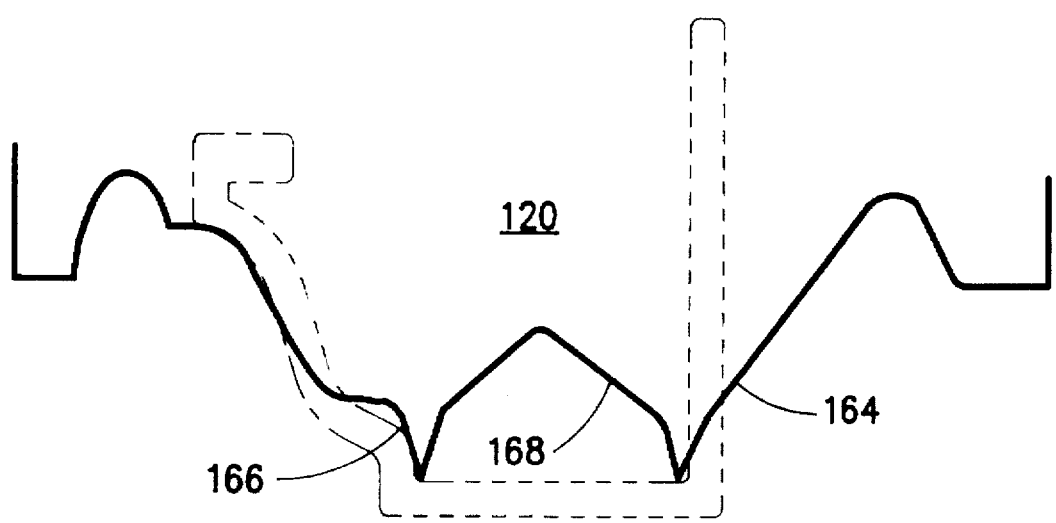
Figure 11D:
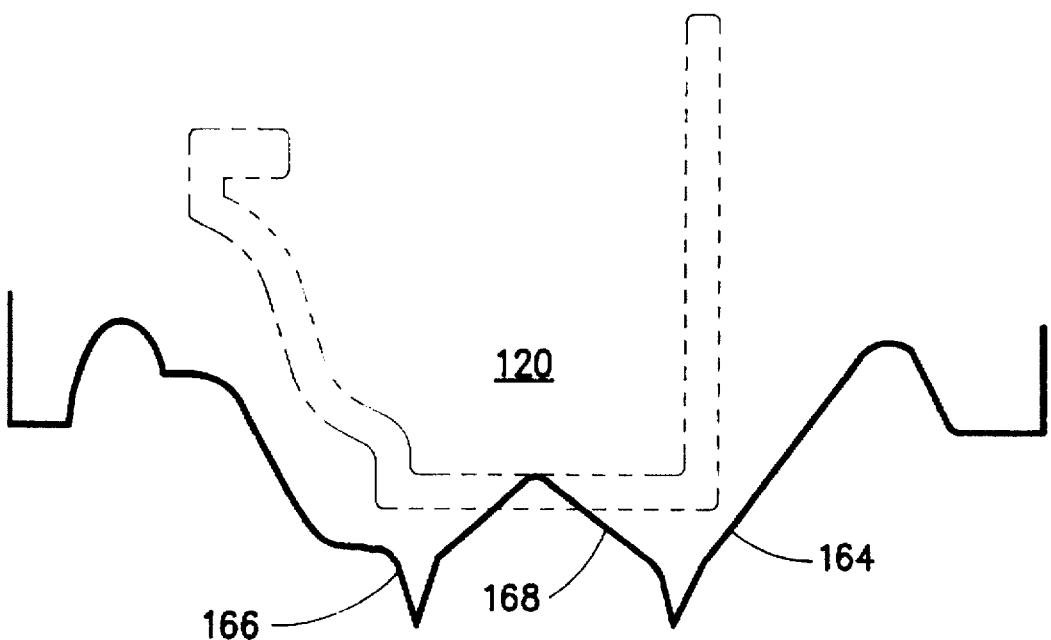

The cutting action of blade 120 in shear assembly 100 is illustrated in the diagrammatic views of 11(a)–11(d). In FIG. 11(a), blade 120 is positioned above formed sheet 26, represented here as a dotted outline of profiled opening 115 within front plate 112. This positioning of the blade is one which corresponds to its position when it is not cutting formed sheet 26. It may be seen that blade 120 has a contoured cutting edge 164 configured here to include teeth 166 and 168. FIG. 11(b) shows the initial shearing action of blade 120 as it cuts formed sheet 26. Here, it may be seen that cutting edge 164 contacts lateral margins 28 and 30 of formed sheet 26 at oblique rake angles and progressively scissor cuts these portions of the sheet. FIG. 11(c) shows the locations where first tooth 166 and second tooth 168 puncture formed sheet 26 at medial locations to make medial cuts therein. It can be seen in this illustration that after sheet 26 is punctured by the teeth, the blade continues to progressively cut the sheet in laterally outward directions from each tooth. Finally, FIG. 11(d) shows the blade as it completes the shearing of sheet 26. Once each tooth has punctured sheet 26 and progressively cut in the sheet 26 laterally outward directions, only a small region of central portion 32 remains to be cut, after which the formed sheet 26 is complete severed. Preferably, the blade contour is matched to the profile such that the rake angle is always at least five degrees.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

We claim:

1. A forming apparatus adapted to receive an elongated sheet of formable material and operative to form a selected profile thereon, comprising:

(a) a frame having an entrance at a first end and an exit at a second end;

(b) a sheet drive supported by said frame and operative to advance the elongated sheet therethrough, said sheet drive consisting of three pairs of co-acting rollers, each of said pairs being longitudinally spaced from an adjacent one of said pairs in a downstream direction from said entrance to said exit, each of said pairs of co-acting rollers including a driven roller and a free-wheeling roller rotatably journaled with respect to said frame on transverse axes, each said driven roller and free-wheeling roller having a circumferential layer of polyurethane;

(c) a drive assembly interconnected to each said driven roller and operative to rotatably drive each said driven roller whereby each of said pairs of co-acting rollers is operative to engage a portion of said elongated sheet and advance said sheet in a downstream direction through said frame to discharge said sheet at the exit;

(d) a plurality of forming rollers disposed in said frame downstream of said entrance, said forming rollers positioned to engage portions of said sheet and operative to form said sheet into a formed sheet having the selected profile; and (e) a shear assembly disposed proximate to said exit and operative to receive said formed sheet and selectively actuable to cut said formed sheet into sections of selected length.

2. A forming apparatus according to claim 1 wherein said transverse axes are oriented parallel to said sheet.

3. A forming apparatus according to claim 1 wherein each of said free-wheeling rollers is positioned above said elongated sheet and each of said driven rollers is positioned below said elongated sheet.

4. A forming apparatus according to claim 1 wherein each said free-wheeling roller is supported on a subframe that is mounted to said frame.

5. A forming apparatus according to claim 4 wherein said subframe includes adjustable subframe mounts for permitting adjustment of said subframe relative to said frame.

6. A forming apparatus according to claim 1 wherein rotation of each said driven roller imparts an equal counter-rotation to its corresponding free-wheeling roller.

7. A forming apparatus according to claim 1 wherein each said free-wheeling roller is adjustably positioned relative to its associated driven roller whereby a space therebetween may be selectively varied.

8. A forming apparatus adapted to receive an elongated sheet of formable material and operative to form a selected profile thereon, comprising:

(a) a frame having an entrance at a first end and an exit at a second end;

(b) a drive system supported by said frame and operative to engage a portion of said elongated sheet and at an upstream end proximate to said entrance and advance said sheet in a downstream direction through said frame to discharge said sheet at the exit;

(c) a plurality of forming rollers disposed in said frame downstream of said entrance and positioned to engage portions of said elongated sheet to form said sheet into the selected profile and thereby produce a formed sheet; and (d) a selectively actuable shear assembly disposed at a downstream location, said shear assembly including a pair of movable blade mounts each having a channel formed therein, said blade mounts spaced in opposed relation to one another with said channels in facing relation, a blade having opposite side edges captured in said channels, a housing for said blade mounts and said blade which housing includes at least one rigid member secured therein to define a pathway for said blade, and a shear drive operative to advance said blade mounts whereby said blade may be reciprocally advanced along said pathway thereby to cut said formed sheet into sections of selected length, and wherein each of said channels has a channel width which is greater than its respective one of said side edges thereby to allow said blade to freely align itself within said pathway.

9. A forming apparatus according to claim 8 wherein said housing includes a rear plate and a face plate spaced apart to define a central cavity which is sized and adapted to receive said blade mounts and said blade therein.

10. A forming apparatus according to claim 9 wherein said rigid member includes a die secured to one of said rear plate and said face plate.

11. A forming apparatus according to claim 10 wherein said die corresponds to said profile along a lower surface of said formed sheet.

12. A forming apparatus according to claim 11 including a second rigid member secured to another of said rear plate and said face plate and corresponding to said profile along the lower surface of said formed sheet.

13. A forming apparatus according to claim 8 wherein each of said side edges is releasably securable to its respective one of said blade mounts.

14. A forming apparatus according to claim 13 including a roll pin disposed at upper and lower ends of said facing channels and including a notch formed at each upper corner of said blade for engaging a respective said roll pin.

15. A forming apparatus according to claim 8 wherein said shear drive includes a pair of rotary gears and each of said mounts includes rack gear teeth adapted to matably engage a respective one of said rotary gears.

16. A forming apparatus according to claim 15 wherein said housing has an opening adjacent each of said blade mounts with a respective one of said rotary gears extending through the opening to engage said rack gear teeth.

17. A forming apparatus according to claim 8 wherein opposed regions of said face plate and said rear plate are each formed to have an opening which corresponds to said profile along a lower surface of said formed sheet thereby permitting said formed sheet to advance through said housing.

18. A forming apparatus adapted to receive an elongated sheet of formable material and operative to form an ogee-type profile along at least one longitudinal margin thereof, comprising:

(a) a frame having an entrance at a first end and an exit at a second end;

(b) a drive system supported by said frame and operative to engage a portion of said elongated sheet and at an upstream end proximate said entrance and advance said sheet in a downstream direction through said frame to discharge said sheet at the exit;

(c) a plurality of forming rollers disposed in said frame downstream of said entrance and positioned to engage portions of said elongated sheet to form said sheet into a selected profile and thereby produce a formed sheet; and (d) a selectively actuable shear assembly disposed at a downstream location and operative to receive said formed sheet and to cut said sheet into sections of selected length, said shear assembly including at least one die having a shape coextensive with the profile along a lower surface of said formed sheet and a blade having a contoured cutting edge configured to have a plurality of teeth such that, as said blade is advanced through said formed sheet, said blade is operative to progressively cut lateral edges of said formed sheet at oblique rake angles before said teeth contact a medial portion of said formed sheet.

19. A forming apparatus according to claim 18 wherein said blade is operative to make a medial cut through said formed sheet at said medial portion, after which said blade continues to progressively shear said medial portion at oblique rake angles in at least one transverse direction away from said medial cut.

20. A forming apparatus according to claim 19 wherein said contoured cutting edge is configured to include at least one tooth for making said medial cut.

21. A forming apparatus according to claim 19 wherein said oblique rake angles are greater than five degrees.

* * * * *